Patented Feb. 15, 1944

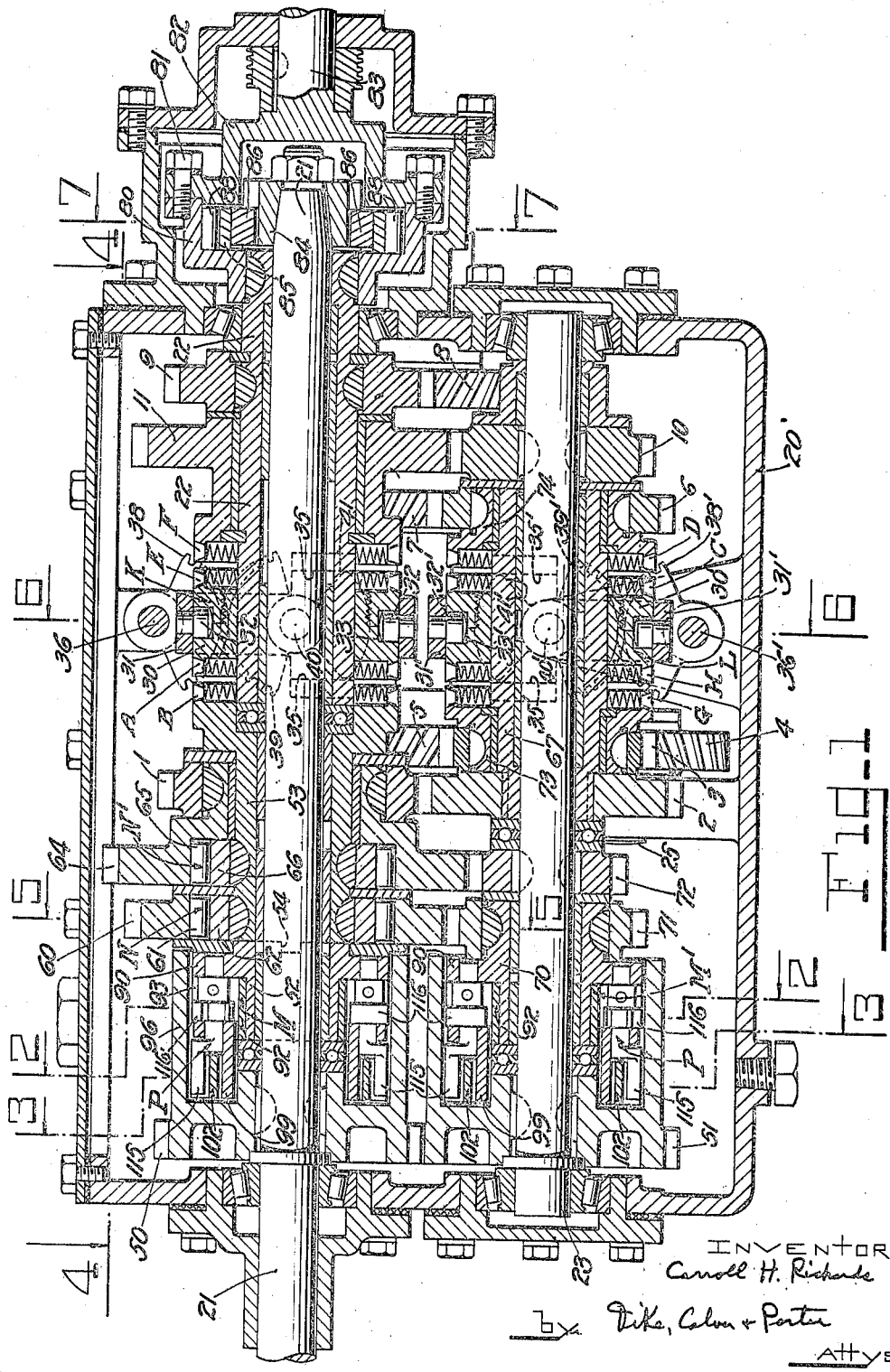

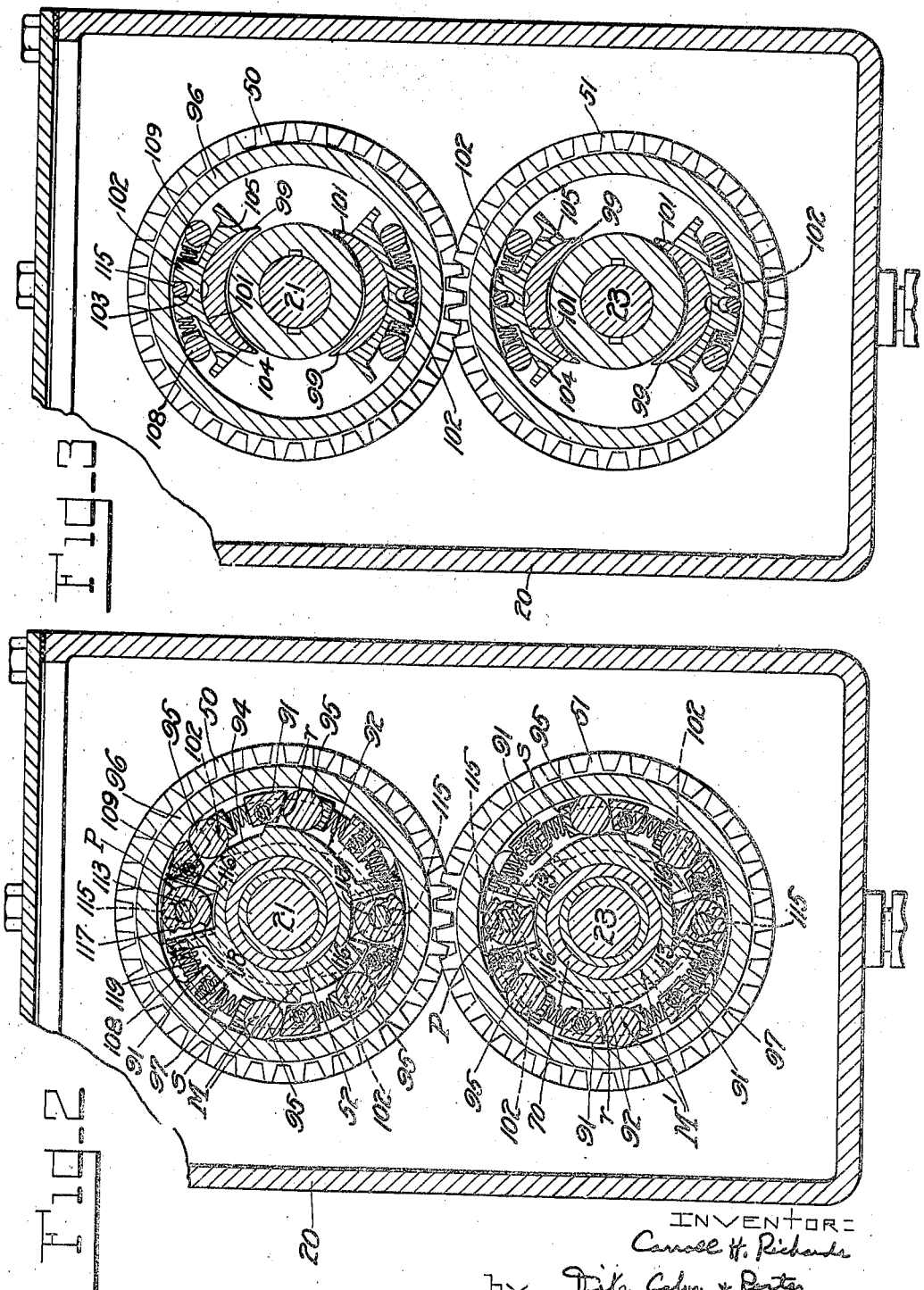

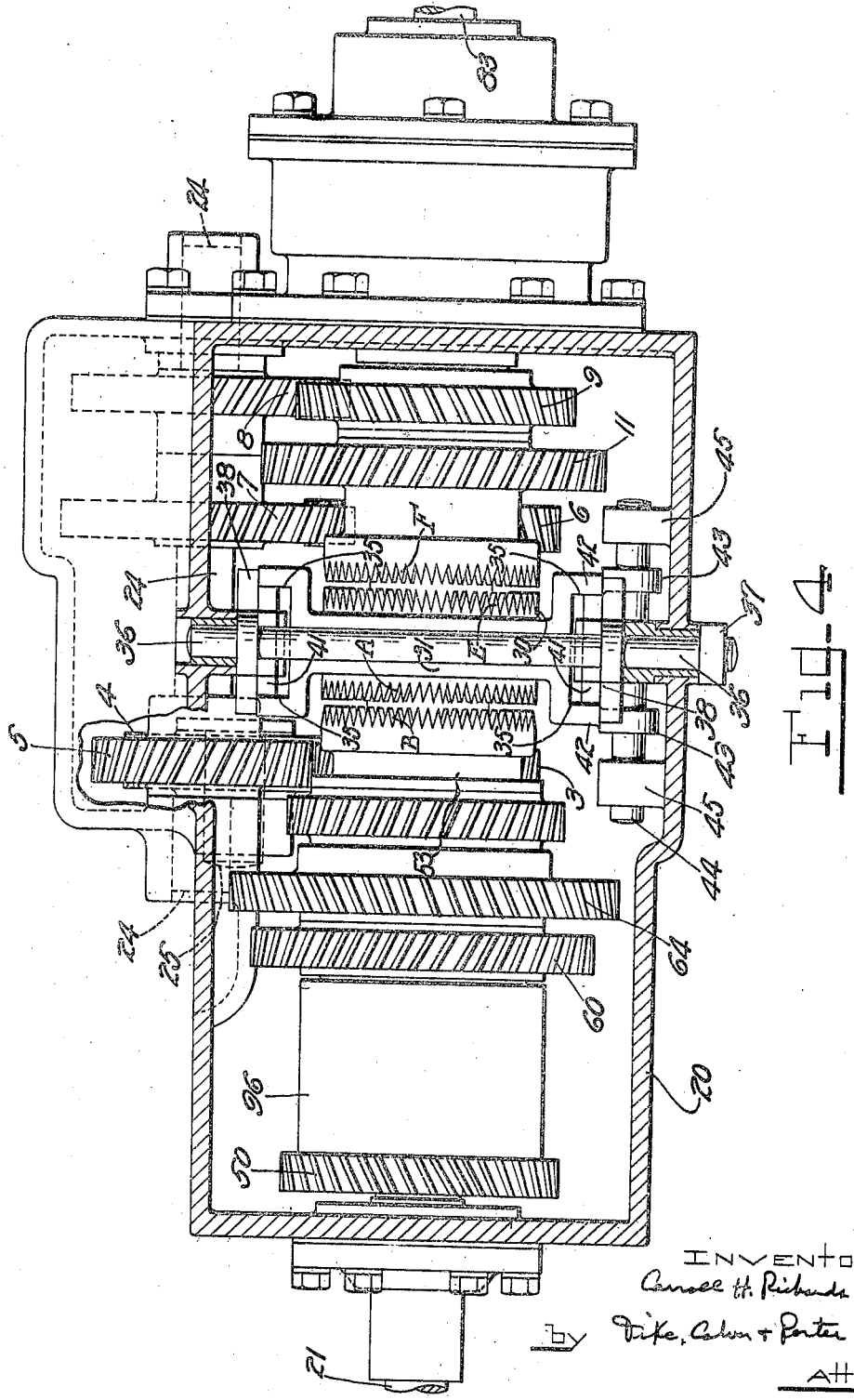

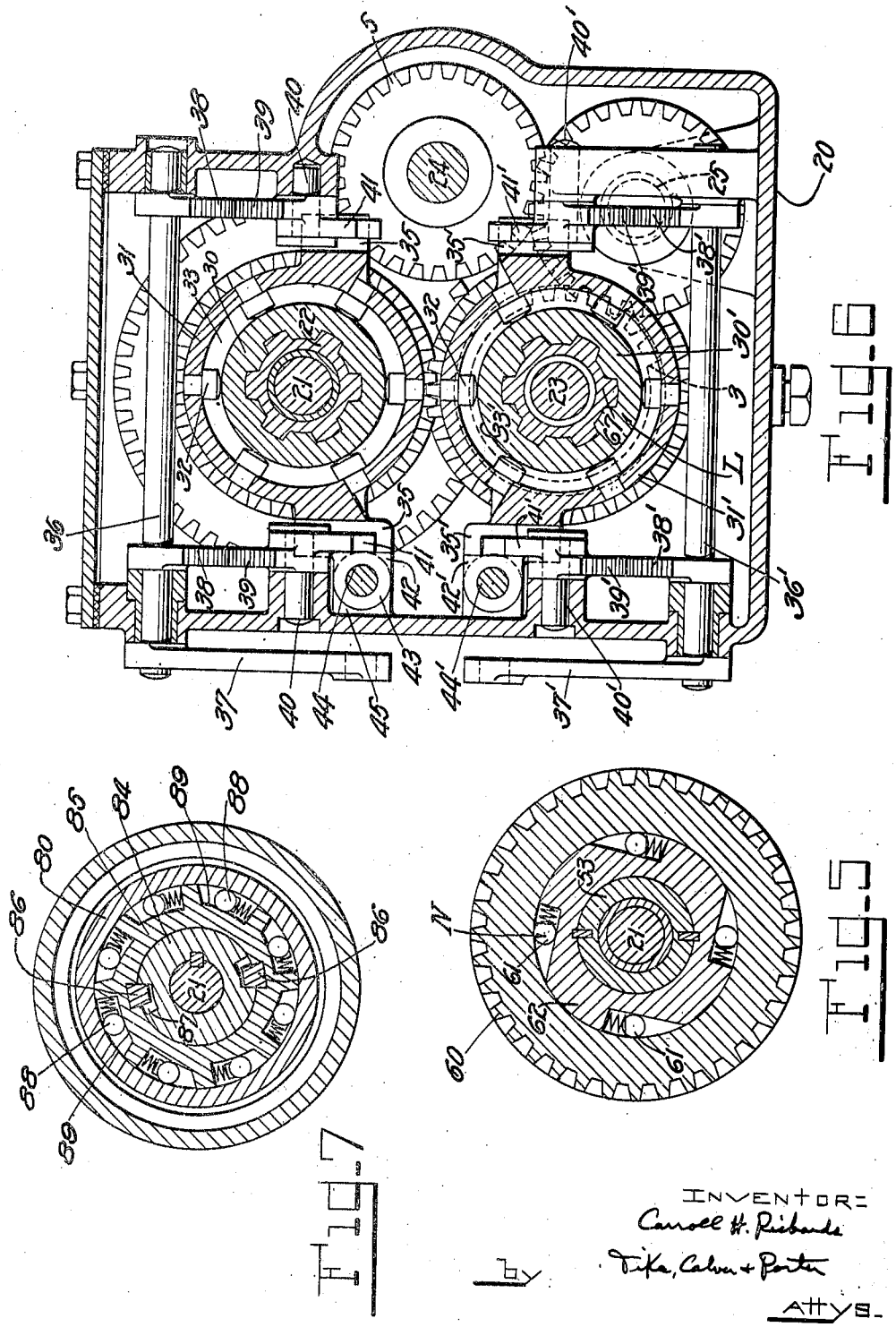

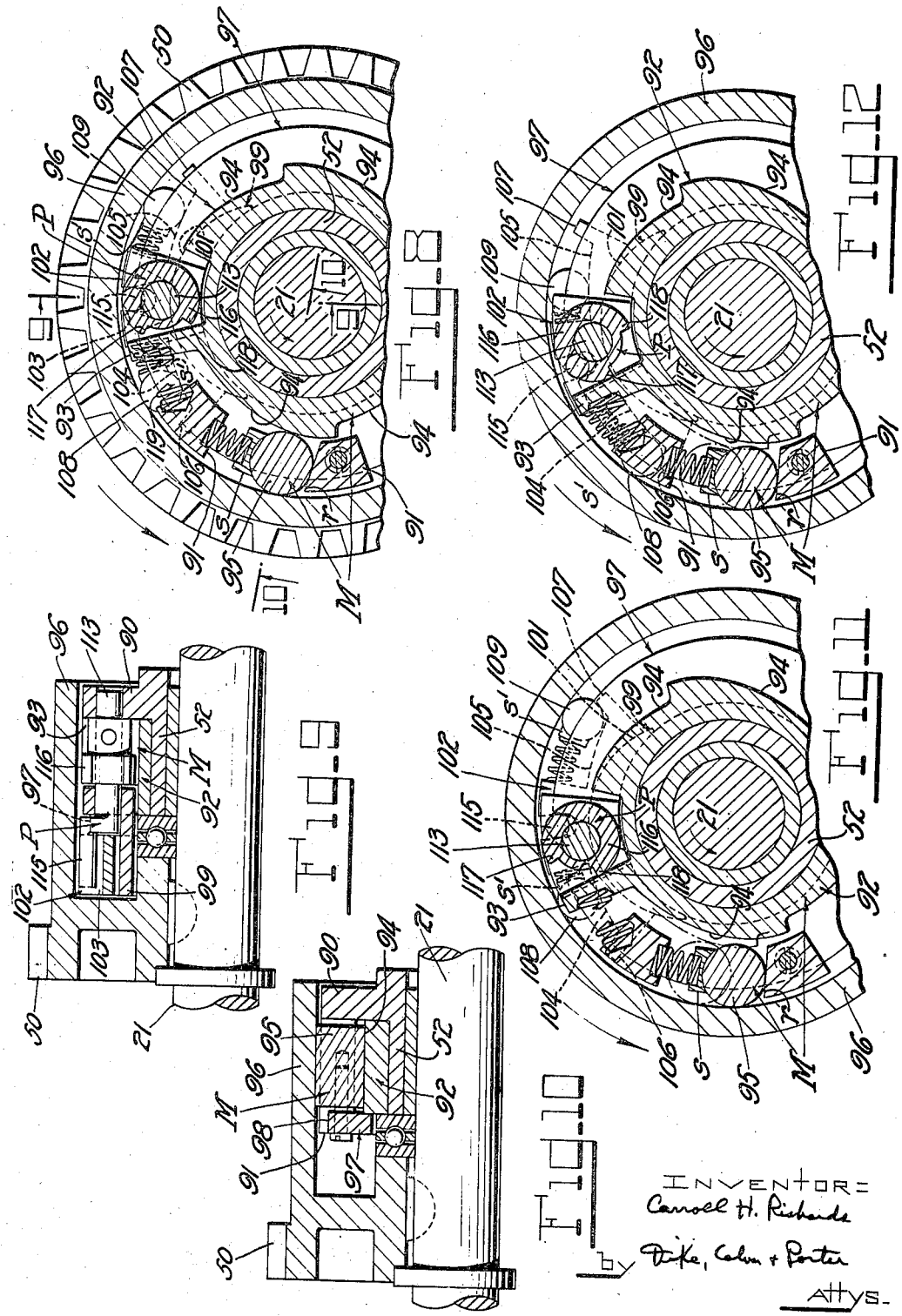

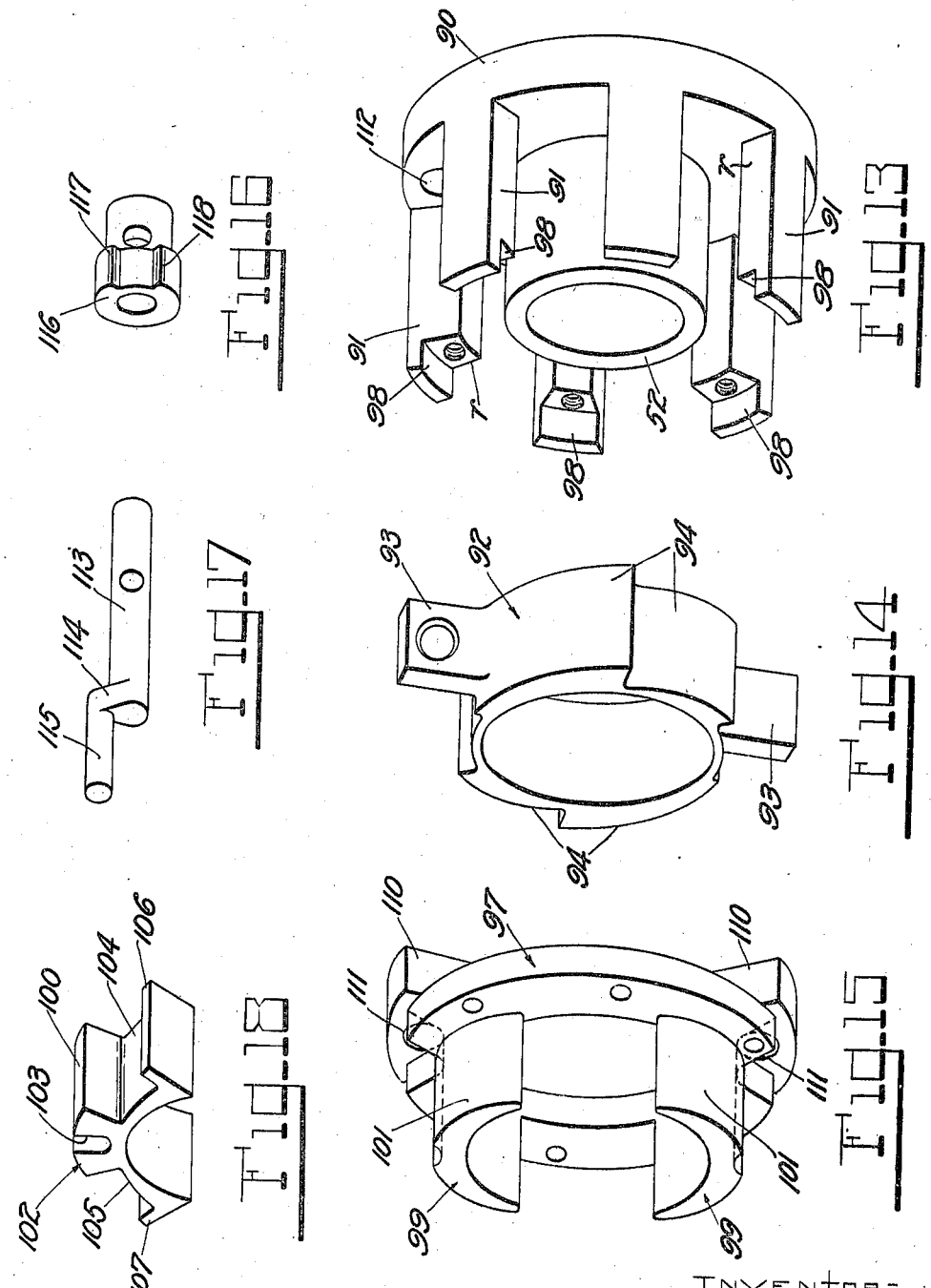

2,341,946

UNITED STATES PATENT OFFICE 2,341,946

TRANSMISSION

Carroll H. Richards, Boston, Mass.

Application November 29, 1941, Serial No. 420,978

12 Claims. (Cl. 192—56)

In my Patent No. 2,039,451, dated May 5, 1936, I have described a change speed mechanism for use in automotive vehicles embodying a power transmission mechanism adapted to provide a driving connection between a driving element and a driven element and adapted to disconnect such driving connection when the torque of driven element exceeds a predetermined amount.

The power transmission mechanism comprised a freely rotatable torque balancer having formed on its peripheral surface a plurality of cam-like surfaces. A roller was operatively associated with each cam surface. The driven element was provided with a plurality of projections each extending adjacent the periphery of the balancer and adapted to engage one of the rollers. The driving element was provided with a drum surrounding the projections on the driven element and adapted to engage the rollers. When the torque of the driving element exceeds the torque of the driven element it tends to rotate the rollers which in turn tend to rotate the balancer to cause the rollers to be wedged between the inner surface of the drum and the cam-like surfaces on the balancer and since the rollers engage the projections on the driven element, the latter is connected in driving relation with the driving element. On the other hand if the torque of the driven element exceeds the torque of the driving element, the tendency is to rotate the balancer faster than the driving element and thus disrupt the driving connection.

Such a power transmission mechanism is interposed in both the direct and intermediate speed drive of the change speed mechanism and each constituted an automatic shifting mechanism operative to effect a driving connection therethrough when the parts are caused to move in synchronism. Consequently, the operator of the vehicle could shift through the various speed ratios by changing the ratio of the torque of the engine to the load by suitable manipulation of the clutch and throttle.

When a vehicle embodying this change speed mechanism is operated over an extended period, the temperature of the lubricant for the change speed mechanism increases and causes the coefficient of friction of the operating parts to increase. As a result there is a tendency for the rollers to be subjected to substantial pressure when the driving and driven elements are not in exact synchronism and while the rollers are rotating resulting in unnecessary wear.

The present invention contemplates a change speed mechanism embodying a power transmission mechanism of the general character above described. In accordance with one aspect of the invention, an auxiliary mechanism is associated with the power transmission mechanism which controls the action of the torque balancer and assures that the driving connection is effected at the exact time of synchronization and is disrupted at all other times regardless of change in viscosity of the lubricant thereby eliminating unnecessary wear on the rollers. The auxiliary mechanism also stabilizes the shifting mechanism when the latter is in driving connection.

The invention also contemplates a change speed mechanism which can be shifted through the various speed ratios in a conventional manner or automatically, that is, in response to changes in the ratio of the driving torque to the resistance torque. More particularly, the invention contemplates such a change speed mechanism in which the direct driving connection is the same for both the conventional and automatic shift.

The invention will be more clearly understood from the following description in conjunction with the accompanying drawings in which:

Fig. 1 is a longitudinal sectional elevational view of a transmission embodying the invention.

Figs. 2 and 3 are sectional views taken upon the lines 2—2 and 3—3 of Fig. 1, respectively.

Fig. 4 is a sectional view taken upon the line 4—4 of Fig. 1.

Figs. 5, 6 and 7 are sectional views taken upon the lines 5—5, 6—6 and 7—7 of Fig. 1, respectively.

Fig. 8 is an enlarged detail sectional view taken upon the line 2—2 of Fig. 1.

Fig. 9 is a sectional view taken upon the line 9—9 of Fig. 8.

Fig. 10 is a sectional view taken upon the line 10—10 of Fig. 8.

Figs. 11 and 12 are views similar to Fig. 8 showing the parts in different positions, and Figs. 13, 14, 15, 16, 17 and 18 are detail perspective views of different parts of the mechanism.

As illustrated in the accompanying drawings, the invention is embodied in an automotive transmission adapted to be shifted through the various speed changes in a conventional manner or to shift automatically in response to the ratio of the torque of the driving element to the torque of the driven element. The transmission illustrated comprises a casing 20 (Figs. 1 and 4) having a main drive shaft 21 rotatably mounted at one end in bearings in the front wall of the casing and rotatably supported at its other end in a sleeve 22 which is mounted for rotation in bearings in the rear wall of the casing. A countershaft 23 is rotatably mounted in bearings in the front and rear walls of the casing. A jack shaft 24 (Fig. 4) is mounted for rotation in bearings in the casing 20 as is also a stud shaft 25. It will be understood that the shafts 21, 23, 24, 25 are arranged in spaced parallel relation.

Clutch mechanisms K and L (Figs. 1 and 6)

are associated with the drive shaft 21 and counter-shaft 23, respectively, for effecting various speed changes manually and for rendering the transmission operative to shift automatically. The clutch mechanism K comprises a sleeve 30 splined upon the sleeve 22 so it may rotate with the latter and be moved axially relative thereto. A ring 31 surrounds the sleeve 30 and carries a plurality of rolls 32 adapted to engage an annular groove 33 in the sleeve 30. The front edge of the sleeve 30 is provided with clutch teeth A and its rear edge is provided with clutch teeth E. Formed integral with the ring 31 is a pair of arms 42 the outer end of each of which is provided with a bearing 43 slidably supported upon a stud shaft 44 extending between and fixed in spaced bosses 45 projecting inwardly from one side wall of the casing. The ring 31 is formed with two pairs of spaced walls 35 extending perpendicular to the shaft 21 from substantially diametrically opposite positions on the ring. As illustrated, one pair of walls 35 are formed by the inner surfaces of the arms 42 as shown in Fig. 4. The ring 31 and sleeve 30 are moved axially upon the sleeve 22 by operating mechanism comprising a shaft 36 extending between the side walls of the casing 20 and rotatably mounted in bearings therein. The shaft 36 may be rotated through a lever 37, one end of which is secured upon the shaft 36 outside the casing 20. The shaft 36 actuates simultaneously two identical means for moving the ring 31 axially by engagement with each pair of spaced walls 35. Thus, a sector gear 38 is fixed upon the shaft 36 inside the casing adjacent each side wall and each is adapted to engage a sector gear 39 mounted for rotation upon a stud shaft 40 fixed in the casing. A cam 41 formed integral with the hub of each gear 39 projects between the spaced walls 35.

A gear 50 (Fig. 1) is keyed upon the drive shaft 21 adjacent the front wall of the casing and is adapted to mesh with a gear 51 keyed upon the counter-shaft 23. A sleeve 52 is mounted for rotation upon shaft 21 adjacent the hub of the gear 50. A mechanism M, described hereinafter, is provided for forming a driving connection between the gear 50 and the sleeve 52 and for disconnecting the same in response to the ratio of the torque of the gear 50, acting as the driving element, to the torque of the sleeve 52, acting as a driven element. A sleeve 53 is rotatably mounted upon the drive shaft 21 adjacent the sleeve 52 and is connected to the latter by tongues 54 one of which is shown in Fig. 1. The sleeve 53 is provided with clutch teeth B adapted to cooperate with the clutch teeth A. A gear 9 is keyed upon the sleeve 22 adjacent the rear wall of the casing. A gear 11 is rotatably mounted upon the sleeve 22 adjacent the gear 9 and one edge of its hub is provided with clutch teeth F adapted to cooperate with the clutch teeth E. A gear 60 (Figs. 1 and 5) surrounds the shaft 21 adjacent the sleeve 52 and forms one element of an overrunning clutch N which may be connected and disconnected by spring pressed rolls 61 with the other clutch element 62 which is keyed to the sleeve 53. A gear 64 surrounds the drive shaft 21 adjacent the gear 60 and forms one element of an overrunning clutch N' similar to the overrunning clutch N. Thus, the gear 64, as one element of clutch N' may be connected and disconnected by spring pressed rolls 65 with the other clutch element 66 which is keyed to the sleeve 53. A gear 1 is keyed upon the hub of the gear 64.

The clutch mechanism L is identical in construction to that of the clutch mechanism K and comprises a sleeve 30' which is splined upon a sleeve 67 rotatably carried by the counter-shaft 23. The front edge of the sleeve 30' is provided with clutch teeth H and its rear edge is provided with clutch teeth C. A ring 31' surrounds the sleeve 30' and carries rolls 32' engaging an annular groove 33' in the sleeve 30'. A pair of arms 42' (see Fig. 6) project from the ring 31' and are slidably carried upon a shaft 44'. Two pairs of spaced walls 35' project from substantially diametrically opposite positions on the ring 31'. The sleeve 30' is moved axially by operating mechanism comprising a shaft 36' which is rotated through a lever 37'. Two sector gears 38' are fixed upon the shaft 36' and mesh with sector gears 39' rotatably mounted upon stud shafts 40'. The hub of each gear 39' is provided with a cam 41' adapted to engage the spaced walls 35'.

A sleeve 70 is rotatably mounted upon the counter-shaft 23 adjacent the gear 51 and is adapted to be connected with the latter or disconnected therefrom by mechanism M' similar to the mechanism M. A gear 71 is keyed upon the sleeve 70 and meshes with the gear 60. A gear 72 is keyed upon the shaft 23 and meshes with the gear 64. A gear 2 is keyed upon the sleeve 67 and meshes with the gear 1. A sleeve 73 is mounted for rotation upon the sleeve 67 adjacent the gear 2 and its rear edge is provided with clutch teeth G adapted to cooperate with the clutch teeth H. A gear 3 is keyed upon the sleeve 73 and meshes with a gear 4 fixed upon the stud shaft 25. Gear 4 meshes with a gear 5 fixed upon jack shaft 24. A gear 10 is keyed upon the counter-shaft 23 adjacent the rear wall of the casing and meshes with the gear 11. A sleeve 74 is rotatably mounted upon the sleeve 67 adjacent the gear 10 and its forward edge is provided with clutch teeth D adapted to cooperate with the clutch teeth C. A gear 6 is keyed upon the sleeve 74 and meshes with a gear 7 fixed upon the jack shaft 24. A gear 8 is fixed upon jack shaft 24 and meshes with the gear 9.

The drive shaft 21 and the sleeve 22 project through the rear wall of the casing 20. A cup-shaped member 80 is keyed to the sleeve 22 and is secured by bolts 81 to a cup-shaped member 82 formed integral with the propeller shaft 83. Means is provided for preventing rotation of the propeller shaft 83 at a speed greater than that of the drive shaft 21 and comprises a sleeve 84 keyed upon the projecting end of the drive shaft. A sleeve 85 forming one element of an overrunning clutch is secured to the sleeve 84 by keys 86 engaging a groove 87 in the sleeve 84. The groove 87 is slightly wider than the key 86 thereby permitting slight relative movement between the sleeves 84 and 85. A driving connection between the sleeve 85 and the member 80 is effected and disrupted by spring pressed rolls 88 interposed between the inner surface of the member 80 and the inclined surfaces 89 upon the sleeve 85.

The mechanism M for providing a drive connection between the gear 50 and the sleeve 52 is identical in construction to the mechanism M' for providing a driving connection between the gear 51 and the sleeve 70. The mechanism M comprises a disc 90 integral with the sleeve 52 and projecting radially therefrom (Figs. 1 and 13). A plurality of posts 91 integral with the disc 90 extend parallel to the axis of the shaft 21 from near the edge of the disc 90. A torque balancer 92 is rotatably mounted upon the sleeve 52 (Figs. 1 and 14) and is provided with radially projecting lugs 93. The periphery of the balancer 92 is provided with a plurality of inclined or eccentric surfaces 94, the curvature of which is determined as described in my prior Patent No. 2,065,244 dated December 22, 1936, by the torque ratio between the driving and driven elements at which it is desired that the driving connection shall be made and broken. A roll 95 (Figs. 2, 8, 11 and 12) is interposed between each of the surfaces 94 and the inner surface of a drum 96 formed integral and projecting rearwardly from the gear 50. A spring pressed shoe s engages each of the rolls 95. When the rolls 95 are wedged between the surfaces 94 and the inner surface of the drum 96 and engage the surfaces r on the posts 91, a driving connection is effected between the gear 50 and the sleeve 52. This driving connection is disconnected when the resistance torque of the sleeve 52 exceeds a predetermined amount, in accordance with the principles described in my prior above mentioned patent. In the mechanism M', the disc 90 is integral with the sleeve 70.

In accordance with one aspect of the present invention, an auxiliary mechanism P is associated with each mechanism M and M' for assuring the rotation of the torque balancer 92 into and out of its driving relation to the driving and driven elements when the torque conditions are such that such movement should be brought about but otherwise might be affected by various changing conditions, such as a change in the viscosity of the transmission lubricant. This mechanism comprises a plate or ring 97 fitted in the rabbets 98 formed in the free ends of the posts 91 and secured thereto. The ring 97 is provided with a pair of forwardly extending projections 99. Each of the projections 99 is formed with an eccentric outer surface 101, the curvature of which changes more rapidly than that of the inner surface of the drum 96. An actuator 102 is provided with an inner surface having a curvature the same as that of the surface 101 and is adapted to be slidably supported by the latter. The actuator 102 is provided with a central projection 100 having a slot 103. The actuator 102 also is provided with spaced curved outer surfaces 104 and 105, the curvature of which changes less rapidly than the curvature of the inner surface of the drum 96. The curved surfaces 104 and 105 extend between the central projection 100 and projections 106 and 107 at opposite ends of the actuator 102. Rolls 108 and 109 rest upon surfaces 104 and 105, respectively, and are adapted to engage the inner surface of the drum 96 to provide a driving connection between the latter and the actuator 102. Each of the rolls 108 and 109 is engaged by a spring pressed shoe s'.

A projection 110 extends from the rear face of the ring 97 in back of each of the projections 99. Each projection 110 is provided with a bearing 111 aligned with a bearing 112 in the disc 90 for rotatably supporting a shaft 113. A crank 114 projects from one end of the shaft 113 and is connected to an offset shaft 115 which slidably engages the slot 103. A cam 116 is secured to the shaft 113 and is provided with spaced dogs 117 and 118 adapted to engage one of the lugs 93. The lugs 93 are urged toward the cams 116 by springs 119.

The operation of the mechanisms M and M' is such that when the torque of the driven element exceeds a predetermined amount relative to the torque of the driving element, the torque balancer 92 rotates in the direction of the drive. Thus, if the drive shaft 21 is rotating in the direction indicated by the arrows in Figs. 8, 11 and 12, the balancer 92 rotates from the position shown in dotted line to the position shown in full line in Fig. 11 to break the driving connection between the driving and driven elements. As permitted by the relative torques of the driving and driven elements, the torque balancer 92 rotates in the opposite direction from the full line position to the dotted line position as shown in Fig. 11 to effect a driving connection between the driving and driven elements, as explained in my above mentioned prior patent.

In accordance with the present invention, the auxiliary mechanism P controls the movement and position of the torque balancer 92. When the driving and driven elements are connected in driving relation they move in synchronism and the actuator 102 is positioned as shown in Fig. 8. If, however, the driving element should start to move faster than the driven element, a driving connection is effected between the drum 96 and the actuator 102 by the roll 108 to cause the actuator 102 to be moved relative to the sleeve 52 and in the direction of the drive to the position shown in Fig. 12, namely, until the relationship between the inner surface of the drum 96 and the surface 104 is such as to render the driving connection between the drum and actuator ineffective. If the driving element instead of moving faster than the driven element should start to move slower than the driven element a driving connection is effected between the drum 96 and the surface 105 by the roll 109 to move the actuator 102 in the opposite direction relative to the sleeve 52 from the position shown in Fig. 8 to that shown in Fig. 11, namely, until the relationship between the inner surface of the drum 96 and the surface 105 is such as to disrupt the driving connection. In either case, movement of the actuator relative to the sleeve 52 moves the shaft 115 about the axis of the shaft 113 and, consequently, causes the shaft 113 carrying the cam 116 to rotate. This rotation of the cam 116 causes one or the other of the dogs 117 and 118 to engage the lugs 93 and rotate the torque balancer 92 from the position shown in dotted lines to the position shown in full lines in Figs. 11 and 12 and hold it in the latter position until the actuator is caused to move again. When the relative torques of the driving and driven elements approach conditions such as to effect a driving connection therebetween, the resulting relative movement between the driving and driven elements move the actuator relative to the driven element to return the actuator to the position shown in Fig. 8 and in so doing causes rotation of the cam 116 to permit the springs 119 to move the lugs 93 and, consequently, rotate the torque balancer 92 from the position shown in full line to the position shown in dotted line in Figs. 11 and 12.

When the transmission embodying the invention is to be operated through the various speed changes automatically, the operator actuates the clutch mechanism K to engage the clutch teeth A and B. Power is supplied to rotate the drive shaft 21 to cause rotation of the gears 50 and 51 and the counter-shaft 23. The mechanism M attempts to provide a driving connection between the gear 50 and sleeve 52 and thence through the sleeve 53, clutch elements A and B, sleeve 22, and members 80 and 82 to the propeller shaft 83, but since the torque of the propeller shaft is so great the mechanism M cannot effect such a driving connection. Consequently, the mechanism M' attempts to provide a driving connection between the gear 51 and the sleeve 70 and thence through the gears 71 and 60, clutch element 62, sleeve 53, clutch elements A and B, sleeve 22 and elements 80 and 82 to the propeller shaft. Since the torque of the propeller shaft still is too great the mechanism M' cannot effect this driving connection. Consequently, the drive will be from the main drive shaft 21 through gears 50 and 51 to the counter-shaft 23 and thence through gears 72 and 64, clutch element 66, sleeve 53, clutch elements A and B, sleeve 22 and elements 80 and 82 to the propeller shaft 83. Thus, the vehicle will start in low speed ratio. When the torque ratio changes such that the mechanism M' may effect a driving connection between the gear 51 and sleeve 70, the drive is through these elements as above described, and the vehicle will then be operating in intermediate speed ratio. When the torque ratio has changed such as to permit a drive to be effected between the gear 50 and the sleeve 52 by the mechanism M, the drive will be direct as above described.

If it is desired to drive the propeller shaft 83 in reverse direction, the clutch elements A and B are disengaged and the clutch elements C and D are engaged. The drive then will be from the drive shaft 21 through gears 50 and 51, counter-shaft 23, gears 72, 64, 1 and 2, clutch elements C and D, sleeve 74, gears 6, 7, 8 and 9, sleeve 22 and elements 80 and 82 to the propeller shaft 83.

If it is desired to operate the transmission in a conventional manner, the clutch elements G and H are engaged to effect operation in low speed ratio. The drive then will be from the drive shaft 21 through gears 50 and 51, counter-shaft 23, gears 72, 64, 1 and 2, sleeve 67, clutch elements G and H, sleeve 73, gears 3, 4, 5, 8 and 9, sleeve 22 and thence through elements 80 and 82 to the propeller shaft 83.

If it is now desired to shift to conventional intermediate speed, the clutch elements E and F are engaged and the drive then will be effected from the drive shaft 21 through gears 50 and 51, counter-shaft 23, gears 10 and 11, clutch elements E and F, sleeve 22, and elements 80 and 82 to the propeller shaft 83.

To effect a conventional direct drive, the clutch elements A and B are engaged and the drive then will be from the drive shaft 21 through gear 50, mechanism M, sleeves 52 and 53, clutch elements A and B, sleeve 22 and thence through elements 80 and 82 to the propeller shaft 83. It will be noted that the transmission is now set to operate automatically. Consequently, if the torque ratio changes the shift through the various speed changes will be effected automatically.

I claim:

1. In a device having driving and driven elements, and means actuated in response to the torque ratio of said driving and driven elements for effecting a driving connection between said elements and for disconnecting said driving connection, said means including a movable member and connections adapted to transmit to said member forces representative of the torques of said driving and driven elements, the combination therewith of mechanism responsive to relative movement of said driving and driven elements for controlling said means to make and break said driving connection.

2. In a device having driving and driven elements, and means for effecting a driving connection between said elements and for disconnecting the same including a member movable into and out of a predetermined driving position relative to said driving element to make and break said driving connection respectively, the combination therewith of means for moving said member including a movable actuator, and means for moving said actuator between predetermined limits relative to said driven element in one direction when said driving element moves faster than said driven element and in the opposite direction when said driving element moves slower than said driven element.

3. In a device having driving and driven elements, and means for effecting a driving connection between said elements and for disconnecting the same including a member movable into and out of a predetermined driving position relative to said driving element to make and break said driving connection respectively, means for moving said member from a given position relative to said driven element into said predetermined position and back to said given position, mechanism for actuating said moving means when said driving element moves faster than said driven element, mechanism for actuating said moving means when said driving element moves slower than said driven element, and separate means associated with each of said mechanisms for rendering its associated mechanism inoperative when said member has reached said given position.

4. In a device having driving and driven elements, and means for effecting a driving connection between said elements and for disconnecting the same including a member movable into and out of a predetermined driving position relative to said driving element to make and break said driving connection respectively, means operatively associated with said elements for moving said member relative to said driving element from a predetermined non-driving position to said predetermined position and back to said non-driving position in response to a force resulting from relative movement of said elements, said moving means including a controlling element for rendering said moving means inoperative when said member reaches said non-driving position until the direction of said force is reversed.

5. In a device having driving and driven elements, and means for effecting a driving connection between said elements and for disconnecting the same including a member movable into and out of a predetermined driving position relative to said driving element to make and break said driving connection respectively, a movable actuator, means for moving said actuator between two spaced positions relative to said driven element in response to a force resulting from relative movement of said elements, said moving means including a controlling element for rendering said moving means inoperative when said actuator reaches either of said spaced positions until the direction of said force is reversed, and means for moving said member from a predetermined non-driving position to said predetermined driving position and back to said non-driving position as said actuator is moved between said spaced positions.

6. In a device having a driving element, a driven element, and means actuated in response to the torque ratio of said driving and driven elements for effecting a driving connection between said elements and for disconnecting said driving connection, said means including a movable member and connections adapted to transmit to said member forces representative of the torques of said driving and driven elements whereby said member is moved in response to variation of said torque ratio into and out of a predetermined position relative to said driving element to make and break respectively said driving connection, the combination therewith of means responsive to relative movement of said driving and driven elements for moving said member into and out of its driving relation to said driving element as said elements move between synchronism and a predetermined amount out of synchronism.

7. In a device having a driving element, a driven element, and means for effecting a driving connection between said elements and for disconnecting the same including a member movable into and out of a predetermined position relative to said driving element to make and break respectively said driving connection, the combination therewith of means for moving said member including a movable actuator, driving means for moving said actuator in one direction relative to said driven element when said driving element moves faster than said driven element and for moving said actuator in the opposite direction relative to said driven element when said driving element moves slower than said driven element, and means responsive to relative movement of said actuator and driven element for limiting the extent of movement of said actuator relative to the driven element in both of said directions.

8. In a device having driving and driven elements, and means for effecting a driving connection between said elements including a member movable into and out of a predetermined driving position relative to one of said elements to make and break said driving connection respectively, the combination therewith of a movable actuator, means for moving said actuator in synchronism with said elements and in the same or opposite direction relative to one of said elements when said elements move relatively, means responsive to said relative movement of said actuator for moving said member relative to one of said elements, and means for limiting the extent of said relative movement of said actuator in both of said directions.

9. In a device having a driving element, a driven element, and means actuated in response to the torque ratio of said driving and driven elements for effecting a driving connection between said elements and for disconnecting said driving connection including a member movable into and out of a predetermined position relative to said driving element to make and break respectively said driving connection, the combination therewith of means for moving said member including a movable actuator, means for providing a driving connection between said actuator and said driving element to cause the actuator to move with the driving element, and means for controlling said actuator to permit it to be moved with said driving element as said elements are moved relatively between synchronism and a predetermined amount out of synchronism.

10. In a device having a driving element, a driven element, and means actuated in response to the torque ratio of said driving and driven elements for effecting a driving connection between said elements and for disconnecting said driving connection, said means including a movable member and connections adapted to transmit to said member forces representative of the torques of said driving and driven elements whereby said member is moved in response to variation of said torque ratio into and out of a predetermined position relative to one of said elements to make and break respectively said driving connection, the combination therewith of means including a movable actuator for moving said member, and means for causing said actuator to move with one of said elements as said elements are moved relatively between synchronism and a predetermined amount out of synchronism.

11. In a device having driving and driven elements rotatable about a common axis, and means actuated in response to the torque ratio of said driving and driven elements for effecting a driving connection between said elements and for disconnecting said driving connection including a member rotatable about said axis into and out of a predetrmined position relative to said driving element to make and break respectively said driving connection, the combination therewith of a slide, a support for said slide integral with said driven element and having a curved supporting surface eccentric with said axis, driving means for moving said slide in one direction relative to said driven element when said driving element moves faster than said driven element and for moving said slide in the opposite direction relative to said driven element when said driving element moves slower than said driven element, and means for causing said member to move with said slide.

12. In a device having driving and driven elements, and means for effecting a driving connection between said elements and for disconnecting the same including a member movable into and out of a predetermined position relative to said driving element to make and break respectively said driving connection, the combination therewith of a cam rotatably carried by said driven element and adapted to engage and move said member in one direction out of said predetermined position regardless of the direction of rotation of said cam, resilient means for maintaining said member in operative relation to said cam, a movable actuator, operative connections between said actuator and cam whereby movement of the former causes rotation of the latter, driving means for moving said actuator in one direction relative to said driven element when said driving element moves faster than said driven element and for moving said actuator in the opposite direction relative to said driven element when said driving element moves slower than said driven element, and means responsive to relative movement of said actuator and driven element for limiting the extent of movement of said actuator relative to the driven element in both of said directions.

CARROLL H. RICHARDS.